June 30, 1942.  G. W. ASHLOCK, JR  2,288,062
FRUIT HANDLING MACHINE
Filed Sept. 27, 1940   2 Sheets-Sheet 1
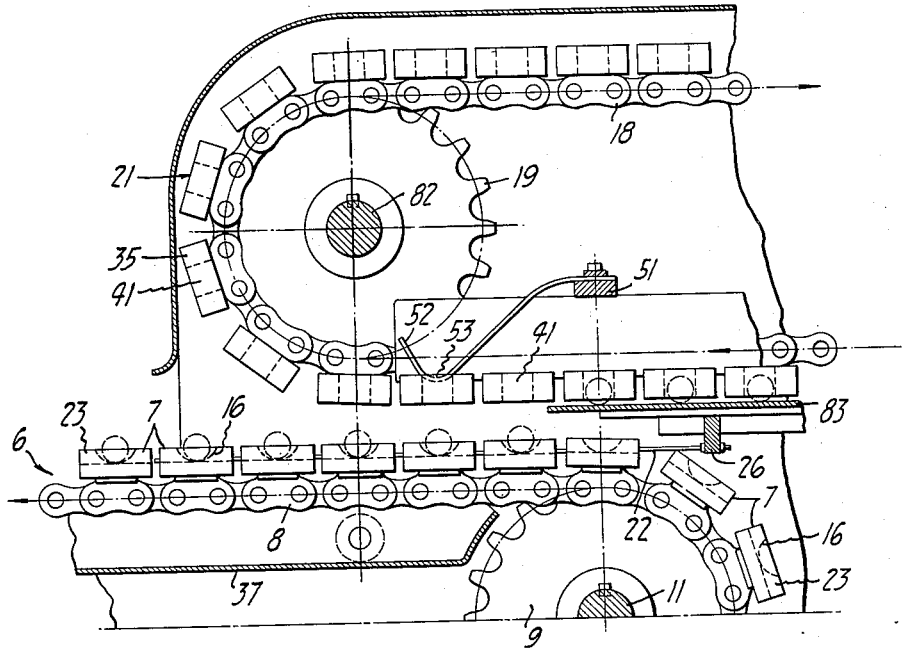
FIG_1_
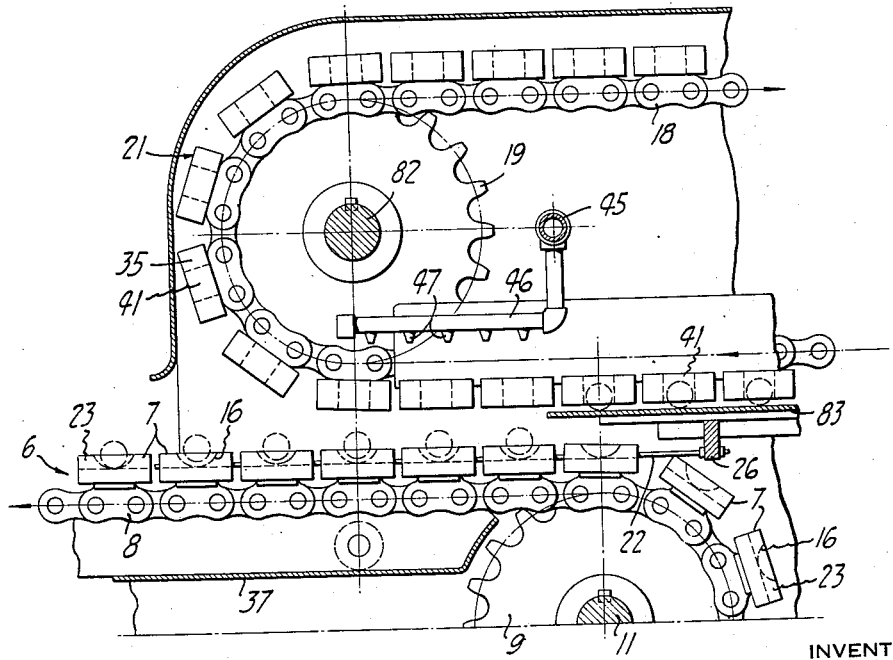
FIG_2_
INVENTOR
George W. Ashlock Jr.
BY Robert H. Eckhoff
ATTORNEY

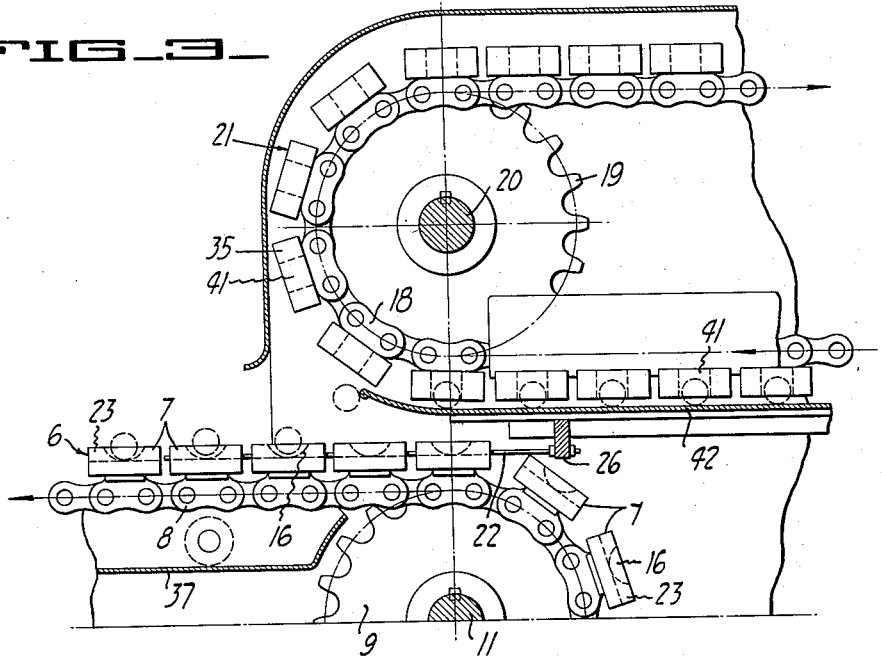
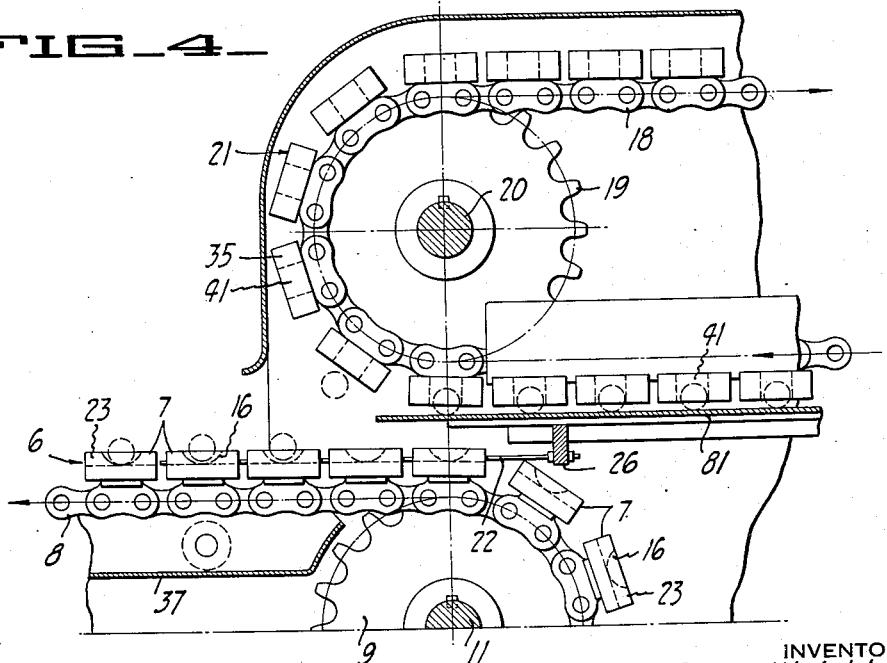

Patented June 30, 1942

2,288,062

UNITED STATES PATENT OFFICE 2,288,062

FRUIT HANDLING MACHINE

George W. Ashlock, Jr., Oakland, Calif.

Application September 27, 1940, Serial No. 358,654

8 Claims. (Cl. 198—33)

This invention relates to the orienting on a conveyor of generally spherical objects, fruits such as cherries, peaches, plums, apricots, tomatoes and the like, and particularly to improved mechanisms of the type disclosed in my Patents Number 2,212,892 and Number 2,213,893 issued August 27, 1940 and September 3, 1940.

Operating upon cherries, for example, the machines disclosed in my aforementioned patents are effective to straighten better than 50% and as much as 75% and frequently as high as 80% of the fruit delivered. In studying the machine in an attempt to improve its operation and assure a higher percentage of fruit straightening, I discovered that the lack of effectiveness in this machine was due not to any mechanical failure but rather to the fact that the fruit upon which it was operating was irregular in configuration.

The difficulty presented by this will be more apparent when it is recalled that the machines disclosed in my aforesaid patents typically include a cup-like receptacle of a suitable size adapted to the article to be handled. Usually the receptacles are provided as a part of a movable straightener conveyor employed to carry the articles on, after the straightening or orienting, to some other operation. Adjacent the bottom of each receptacle an elongated member is positioned at least for a short period of time. The receptacle and the elongated member are moved relative to each other. With a generally spherical article placed therein, the article is continuously rotated by the relative movement between the elongated member and the cup-like receptacle. Now if the spherical article has a face thereon capable of supporting the article in a stable position on a plane surface, the article will promptly come to rest with this face parallel to but out of effective engagement with the elongated member. In a cherry or like article this position will correspond to the stem end or dimple in the cherry being down. With the fruit irregularly shaped, it is not unusual for the fruit to become positioned across the receptacle and entirely supported thereby with the fruit out of contact with the elongated member. The relative movement between the member and the receptacle is then ineffective due to lack of contact between the member and the article.

One observation made by me in connection with the fruit straightening machine is that an article is more quickly brought into a stable position if it be initially placed in the cup-like receptacle with force sufficient to cause the article to bounce around between the cup-like receptacle and the elongated member cooperating with the receptacle. In accordance with this invention the feeding conveyor or other mechanism employed to place or deposit the cherry on the straightening conveyor is so positioned relative to the feed conveyor that the cherries drop forcefully onto the straightener conveyor and bounce around in the cup-like receptacles thereon.

Extended tests of the machine of the present invention show that it is effective to straighten more of the fruit delivered to it than machines heretofore even though the fruit is so irregular in shape that without the means of the present invention only about one-half of the fruit could be straightened.

The invention includes other objects and features of advantage, some of which, together with the foregoing, will appear hereinafter wherein the present preferred embodiment of the invention is disclosed.

In the drawings accompanying and forming a part hereof, Figure 1 is a side elevation, partly in section, through the present preferred machine embodying the present invention.

Figures 2, 3 and 4 are also side elevations, partly in section, each figure illustrating a modified form of machine embodying the invention.

In general the preferred machine of the present invention includes a receptacle formed adjacent its bottom to permit an elongated member to be moved relative to an article placed haphazardly in the receptacle. Movement between the receptacle and the elongated member causes the article to be rotated in the receptacle until the article is in a selected final position wherein that face, capable of supporting the article stably on a plane surface, is positioned with the said face parallel to a horizontal plane, or substantially so. The articles to be positioned with the said face parallel to a horizontal plane are caused to be placed in the receptacles through utilization of a suitable feeding means which, in accordance with this invention, permit the articles to drop under the influence of gravity freely whereby each article bounces around in its receptacle and between the receptacle and the cooperating elongated member.

As appears in Figure 1, I provide a fruit receiving conveyor indicated generally at 6; the straightening or article orientation is effected on this conveyor. The orientation conveyor is suitably made up after the manner of conveyor 10 as disclosed in my United States Patent Number 2,157,518 of May 9, 1939. As appears in said patent, a plurality of fruit holders, identified herein as 7 are positioned between oppositely provided conveyor chains 8 extending over sprockets 9 on shaft 11. Each fruit holder is made up of a metal strip 12 having integrally bonded thereto a suitably apertured rubber facing sheet 14 as is disclosed in my Patent Number 2,209,305 issued July 30, 1940. This sheet includes one or more receptacles 16, each preferably having an inner concave surface providing a hemispherical cavity or pocket. When a pitting knife is employed a centrally positioned aperture 17 extends through each receptacle to pass the pit.

The conveyor 6 usually moves toward a suitable working or fruit handling mechanism, such as a pitting machine or to some other suitable machines for cutting, peeling, trimming, stoning, halving, quartering, or performing any other suitable operation. The conveyor 6 is suitably fed with articles to be handled but I prefer to provide as a feeding device a second conveyor indicated generally at 21 and carrying articles toward conveyor 6, and depositing them on conveyor 6 generally after the manner disclosed in my United States Patent Number 2,190,970 of February 20, 1940. The relation between the two conveyors and the cooperation between them will be further discussed hereinafter in detail.

In accordance with this invention, means are provided for turning an article in each holder to position the article in a selected position. In accordance with this invention, I provide a rod member indicated generally at 22 extending through slot 23 formed in each fruit holder. This rod member is preferably mounted from a support indicated at 26 in the frame of the machine, and is so positioned that, as the conveyor advances over its path, the rod is positioned adjacent the bottom of the slot 23 and the receptacle in each fruit holder. Usually a length of about one foot suffices for each rod, this length being measured after the fruit or vegetables have been positioned in a haphazard position on conveyor 6 and in the carrier receptacles therein.

As suitable rod members I have employed lengths of string, wire, rubber strips, wooden rods, woven metal members, and roughened glass rods; these were round, rectangular, or polygonal in cross-section. The essential thing to operation is the relative movement between the rod and the fruit holder and the rotation of the fruit thereby obtained.

As is disclosed in my aforementioned patents, the rod member 22 is rotated, oscillated or vibrated. As is also disclosed in the aforesaid patents, the rod member extends in the direction of advance of the conveyor or transverse thereto in which case it is carried by each fruit holder. The showing made herein is merely typical and any one of the several receptacle-rod constructions of my patents is useful instead.

The feed conveyor is made up in much the same manner as the orientation conveyor in that it includes a pair of spaced conveyor chains 18 extended over sprockets 19 on shaft 20. Between the chains are extended rubber covered strip members 35 (see strips 37 in my Patent 2,190,970) apertured as at 41 to receive cherries, or other articles, and move them along skid plate 42 as the bottom conveyor run advances to the left in Figure 1 until finally the articles drop off the end of the skid plate into a receptacle in the orientation conveyor. In my Patent 2,190,970 the skid plate or false bottom is shown as terminating at a point whereat the conveyed articles can drop directly onto the orientation conveyor and are partially confined, after release, by the feed conveyor. This construction I have found does not permit the articles to bounce around sufficiently when they drop; hence I raise the point of release of the articles for a distance above the orientation conveyor more than the greatest dimension of the article handled. This permits the article to fall free of the feed conveyor and to roll around without restriction in the receptacle or the orientation conveyor. In addition to utilizing the free fall of the articles from the feed conveyor, I also preferably include means for positively ejecting the fruit from the feed conveyor onto the orienting conveyor, such means being particularly included in the preferred machine shown in Figure 1 and in the modified form shown in Figure 2. Gravity release alone is employed in the modifications shown in Figures 3 and 4.

In accordance with this invention the release point of feed conveyor 21 is so spaced from the orientation conveyor 6, that articles released by the feed conveyor 21 drop freely under the influence of gravity onto conveyor 6. This is accomplished by locating the conveyor 21 above conveyor 6, in the machines shown in Figures 1 and 2. The distance between the orientation conveyor and the feed conveyor is such that an article released from the feed conveyor is free to roll and bounce around in a receptacle without any restriction from the feed conveyor.

The gravital fall distance is increased in the modified machine shown in Figure 3 by continuing skid plate 42 along the run of the conveyor so that it is positioned above conveyor 6 for a considerable distance, far more than the space between the conveyors or the height of the cherry. The two conveyors are separated more than the height of the article handled while skid plate 41 is continued out and around the run of conveyor 21 for about 30° until the articles are released at a considerable distance above the orientation conveyor to ensure that the initial action between the receptacle, the elongated member and the article is adequate to start the desired orientation movement of the article. The operation of the conveyors is suitably timed to ensure that a released article drops freely into a positioned receptacle off the end of the skid plate 42. The movement of the two conveyors is such that a receptacle 16 in the orientation conveyor is in position to receive an article dropping from the feed conveyor and released by the skid plate.

In Figure 4 I have shown another modification for increasing the gravital fall distance. In this machine, skid plate 81 extends horizontally between the two conveyors and parallel to the horizontal contiguous runs thereof. The skid plate extends beyond the line of center of the sprocket 19 and shaft 20 for a distance sufficient to support the articles moved by the feed conveyor until the articles are practically free from the confining aperture 41. The articles then drop off the end of the skid plate with considerable force into a properly positioned receptacle on the conveyor 6. This ensures that the articles will roll or drop free from the upper or feed conveyor and with such force as to start rotating immediately on one of the vibrating members 22.

Means are also included for assisting in the discharge of articles from the feed conveyor and for increasing the force with which the articles strike the orienting conveyor. In the preferred machine and as illustrative of such means, I have shown supporting bracket 51 (Figure 1) mounted above the upper run of the feed conveyor. On the bracket several spring wire members 52 are mounted, one for each line of apertures 41. The members extend in the direction of advance of the feed conveyor, being formed as at 53 to extend into each aperture 41 as it moves past the associated spring member. Each spring member moves down into an aperture 41 to discharge an article therein, ensuring all are discharged and with force. In this machine, as in the others, the two conveyors are suitably timed so that an article released by the feed conveyor is deposited on conveyor 6.

In Figure 2 I have shown a modification wherein fluid is employed to ensure positive discharge. A shaft 82 is positioned in advance of the center line of shaft 11 so that the contiguous horizontal run of the upper or feed conveyor extends in an overlying relation to the lower conveyor 6 for a considerable distance. Skid plate 83 terminates at a point intermediate the ends of the horizontal run of the upper or feed conveyor so that articles therein drop into a properly positioned receptacle on conveyor 6. To facilitate discharge of the articles from the feed conveyor and to ensure that the discharged articles rotate positively, I positioned a pipe 46 above the feed conveyor and provide a plurality of spray nozzles 47 thereon. Pipe 46 is connected to another pipe 45 leading from a source of fluid under pressure. The fluid discharged through nozzles 47 impinges on the feed conveyor and assists thereby in discharging from the aperture 41 any articles accidentally retained therein beyond the terminal end of the skid plate 83. In addition, when an aperture is free of an article, the discharge from the spray nozzles 47 passes through the apertures 41 to the positioned articles below to assist in vibrating the articles.

Any suitable fluid can be employed and I have successfully used air, although this is relatively expensive. I have also used wet steam, water and brine. In the case of a liquid, a pan 37 is placed beneath the conveyor to collect the fluid and permit its return to a suitable source for ejection through the manifold, pipes and jets.

I claim:

1. In a machine for positioning a generally spherical article having at least one face thereon capable of resting stably on a flat surface, a first conveyor movable over a path, said conveyor including a row of article receptacles, each receptacle having a slot therein extending in the direction of movement of said conveyor and to adjacent the bottom of each of said receptacles, each receptacle having an inner substantially concave surface for supporting an article positioned therein, an article engaging member positioned parallel to a portion of said path and extending therealong in said slot with a surface thereon co-operatively adjacent the bottom of said receptacle, a second conveyor having a portion thereof extending in a spaced relation to and overlying a portion of said first conveyor and spaced from said first conveyor a distance greater than substantially the diameter of the article at that point whereat said second conveyor releases an article carried thereby to fall into a receptacle on said first conveyor when said first conveyor is traversing said first path portion.

2. In a machine for positioning a generally spherical article having at least one face thereon capable of resting stably on a flat surface, a first conveyor movable over a path, said conveyor including a row of article receptacles, each receptacle having an inner substantially concave surface for supporting an article positioned therein, an article engaging member positioned parallel to a portion of said path and extending therealong with a surface thereon cooperatively adjacent the bottom of said receptacle during movement thereof, a second conveyor having a portion thereof extending in a spaced relation to and overlying a portion of said first conveyor, said second conveyor having a plurality of apertures therein, and means positioned adjacent that point whereat said second conveyor releases an article carried thereby to fall into a receptacle on said first conveyor when said first conveyor is traversing said first path portion for ejecting an article in an aperture in said second conveyor, said second conveyor being spaced from said first conveyor at the point of article release a distance at least substantially equal to the diameter of the generally spherical article.

3. In a machine for positioning a generally spherical article having at least one face thereon capable of resting stably on a flat surface, a first conveyor movable over a path, said conveyor including a row of article receptacles, each receptacle having an inner substantially concave surface for supporting an article positioned therein, an article engaging member positioned parallel to a portion of said path and extending therealong with a surface thereon cooperatively adjacent the bottom of said receptacle during movement thereof, a second conveyor having a portion thereof extending in a spaced relation to and overlying a portion of said first conveyor, said second conveyor having a plurality of apertures therein, and means for ejecting a fluid under pressure positioned adjacent that point whereat said second conveyor releases an article carried thereby to fall into a receptacle on said first conveyor when said first conveyor is traversing said first path portion for ejecting an article in an aperture in said second conveyor, said second conveyor being spaced from said first conveyor at the point of article release a distance at least substantially equal to the diameter of the generally spherical article.

4. In a machine for positioning a generally spherical article having at least one face thereon capable of resting stably on a flat surface, a first conveyor movable over a path, said conveyor including a row of article receptacles, each receptacle having an inner substantially concave surface for supporting an article positioned therein, an article engaging member positioned parallel to a portion of said path and extending therealong with a surface thereon cooperatively adjacent the bottom of said receptacle during movement thereof, a second conveyor having a portion thereof extending in a spaced relation to and overlying a portion of said first conveyor, said second conveyor having a plurality of apertures therein, a skid plate for supporting articles carried in apertures in said second conveyor, and means positioned adjacent that point whereat said second conveyor releases an article carried thereby to fall into a receptacle on said first conveyor when said first conveyor is traversing said first path portion for ejecting an article in an aperture in said second conveyor, said second conveyor being spaced from said first conveyor at the point of article release a distance at least substantially equal to the diameter of the spherical article.

5. In a machine for positioning a generally spherical article having at least one face thereon capable of resting stably on a flat surface, a first conveyor movable over a path, said conveyor including a row of article receptacles, each receptacle having an inner substantially concave surface for supporting an article positioned therein, an article engaging member positioned parallel to a portion of said path and extending therealong with a surface thereon cooperatively adjacent the bottom of said receptacle during movement thereof, a second conveyor having a portion thereof extending in a spaced relation to and overlying a portion of said first conveyor, said second conveyor having a plurality of apertures therein, a skid plate supporting articles in said second conveyor apertures and having a terminal edge at a point whereat said articles are a substantial distance above said first conveyor, and means positioned adjacent that point whereat said skid plate terminates and whereat said second conveyor releases an article carried thereby to fall into a receptacle on said first conveyor when said first conveyor is traversing said first path portion for ejecting an article in an aperture in said second conveyor, said second conveyor being spaced from said first conveyor at the point of article release a distance at least substantially equal to the diameter of the generally spherical article.

6. In a machine of the class described, a first conveyor for receiving articles, a second conveyor having apertures therein for moving articles, a skid plate for supporting articles moved by said second conveyor until said second conveyor overlies said first conveyor in a position to discharge an article onto said first conveyor, and means for discharging a fluid under pressure adjacent to the point of discharge of the second conveyor to eject forcefully onto said first conveyor an article moved by said second conveyor, said skid plate being spaced above said first conveyor at said discharge point a distance greater than substantially the maximum dimension of an article whereby a released article falls freely from one conveyor to the other.

7. In combination, a first conveyor movable over a path including a substantially horizontal portion and having a plurality of receptacles therein for reception of generally spherical articles each having at least one face thereon capable of resting stably on a flat surface, means cooperating with each of said receptacles during traverse of said substantially horizontal portion by said first conveyor for moving an article in a receptacle into a position wherein said one face is down and substantially horizontal, and a second conveyor having a portion thereof extending in a spaced relation to and overlying a portion of said first conveyor and spaced from said first conveyor a distance greater than substantially the diameter of the article at that point whereat said second conveyor releases an article carried thereby to fall into a receptacle on said first conveyor and engage said moving means when said first conveyor is traversing said substantially horizontal portion.

8. In combination, a first conveyor movable over a path including a substantially horizontal portion and having a plurality of receptacles therein for reception of generally spherical articles each having at least one face thereon capable of resting stably on a flat surface, means cooperating with each of said receptacles during traverse of said substantially horizontal portion by said first conveyor for moving an article in a receptacle into a position wherein said one face is down and substantially horizontal, a second conveyor having apertures therein for moving articles, and a skid plate for supporting articles moved by said second conveyor until said second conveyor overlies said first conveyor in a position for discharge of an article onto said first conveyor and into engagement with said moving means, said skid plate being spaced above said first conveyor and said discharge point a distance greater than substantially the maximum dimension of an article whereby a released article falls freely from one conveyor to the other.

GEORGE W. ASHLOCK, Jr.